United States Patent Office 3,787,367
Patented Jan. 22, 1974

3,787,367
SOLUBLE COPOLYIMIDES
William J. Farrissey, Jr., Northford, and Philip S. Andrews, Hamden, Conn., assignors to The Upjohn Company, Kalamazoo, Mich.
No Drawing. Filed Nov. 29, 1972, Ser. No. 310,398
Int. Cl. C08g 20/32
U.S. Cl. 260—65                 7 Claims

ABSTRACT OF THE DISCLOSURE

Copolyimides are prepared from pyromellitic dianhydride (PMDA) or mixtures of pyromellitic dianhydride with 3,3',4,4'-benzophenone tetracarboxylic acid dianhydride (BTDA), and mixtures of 4,4'-methylenebis (phenyl isocyanate) (MDI) and toluene diisocyanate (TDI) (2,4-, or 2,6-isomer or mixtures thereof). The mixture of anhydrides is used in a molar percent ratio of PMDA to BTDA of 100 to 75/25 respectively. The mixture of isocyanates is used in a molar percent ratio from about 10/90 to 35/65 of MDI to TDI respectively. The copolyimides of the invention are soluble in their organic reaction solvents but retain their high thermal stability. The solubility allows for the facile preparation of films, laminates, coatings, fibers, and the like. The improvement in heat stability over previously known polyimides is achieved without any loss in solubility properties. The copolyimides can be used in the preparation of high temperature resistant polymer articles and in the various applications for which polyimides are known to be especially adapted.

BACKGROUND OF THE INVENTION

(1) Field of the invention

The present invention relates to novel polymers and is more particularly concerned with novel copolyimides which are soluble in their organic reaction solvents and a process for their preparation.

(2) Description of the prior art

The preparation of insoluble, high temperature resistant, polyimides from benzophenone - 3,3',4,4'-tetracarboxylic acid dianhydride, or pyromellitic dianhydride and various diisocyanates or the corresponding diamines is well known in the art as in U.S. Pats. 3,179,630 and 3,179,631 and 3,562,189 and Sroog et al., J. Polymer Science Part A, vol. 3, pages 1373 to 1390, 1965. Soluble copolyimides have been disclosed in a copending application Ser. No. 124,958, filed Mar. 16, 1971 by L. W. Alberino et al., now U.S. 3,708,458. If the polyimide is prepared via the amide-acid route, namely by reaction of dianhydride with a diamine it is necessary, in order to make useful articles such as films, fibers, or shaped articles, to preform the desired article as the amide-acid then convert to the imide by a heat or a chemical treatment. If the polyimide is prepared via the reaction of dianhydride with diisocyanate, the polyimide usually precipitates from reaction solution. Generally speaking the final polyimide polymer is not easily workable in its final form.

The present invention provides a solution to the above problems by describing polyimides that are soluble in their reaction solvents and yet retain all their high temperature resistant properties when formed into finished articles. A further object of the present invention is to provide soluble polyimides of even greater stability to high temperatures than previously known soluble polyimides.

SUMMARY OF THE INVENTION

This invention comprises novel copolyimides characterized by the presence of recurring units of the formula:

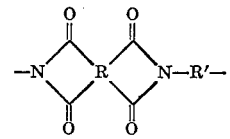

wherein the radical R represents

in 75–100 percent of said recurring units and R represents

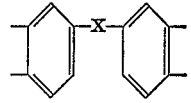

wherein X is a member selected from the group consisting of CO, O, SO$_2$ in the remaining 0–25 percent of said units; and wherein the radical R' represents

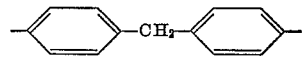

in 10–35 percent of said recurring units and in the remaining 65–90 percent of said units R' is a member selected from the group consisting of

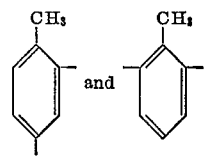

and mixtures thereof.

The copolyimides of the present invention are soluble as prepared in organic solvents, yet retain their excellent high temperature properties when made into films, moldings, coating compositions, laminates and fibers. Due to their solubility the copolyimides of the present invention can be easily worked into finished articles.

DETAILED DESCRIPTION OF THE INVENTION

The novel copolyimides of the invention can be prepared by any of the methods known in the art for the preparation of polyimides from the appropriate anhydride and the appropriate polyisocyanate or corresponding polyamine. Illustratively, the copolyimides of the invention can be prepared by reacting the appropriate mixture of pyromellitic dianhydride (PMDA) and benzophenone-3,3',4,4'-tetracarboxylic acid dianhydride (BTDA) with the appropriate mixture of di(4-aminophenyl)methane (MDA) and toluene diamine (TDA) (2,4-isomer or 2,6-isomer, or a mixture thereof), or with one of said diamines followed subsequently in the reaction by the other of said diamines, to obtain the corresponding polyamide acid according to the following equation:

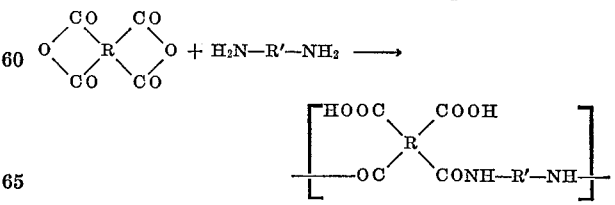

wherein R and R' have the significance above defined. Advantageously, the reactants are brought together in the presence of an inert solvent, i.e. a solvent which does not react with either of the reactants nor interfere in any way with the desired course of the reaction. Advantageously the inert solvent is a dipolar aprotic solvent.

Examples of such solvents are dimethylformamide, dimethylacetamide, dimethylsulfoxide, dimethylsulfone, hexamethylphosphoramide, N-methyl-2-pyrrolidone, tetramethylurea, pyridine, and the like.

Illustrative of the dianhydrides suitable for use in the present invention are: pyromellitic dianhydride, 3,3',4,4'-benzophenone tetracarboxylic acid dianhydride, bis(3,4-dicarboxyphenyl) ether dianhydride, and bis(3,4-dicarboxyphenyl) sulfone dianhydride.

The reaction of the amines and the anhydride is preferably conducted under anhydrous conditions and at temperatures below 50° C. but in some cases temperatures up to 175° C. may be employed. The desired polyamide acid generally is soluble in the reaction mixture and can be isolated therefrom if desired, by conventional methods such as by evaporation of the reaction solvent or precipitation by a non-solvent. The amide acid is then converted to the desired polyimide by dehydration. The dehydration can be accomplished readily by treating the amide acid with an acid anhydride such as acetic anhydride, propionic anhydride, benzoic anhydride and the like, preferably in the presence of a tertiary amine such as pyridine, N,N-dimethylaniline and the like. The ring closure is advantageously conducted at elevated temperatures of 200° C. or higher. Alternatively, the ring closure of the polyamide acid to the desired polyimide can be effected by heat alone.

Illustrative of references which describe detailed conditions for carrying out the above reactions are U.S. Pats. 3,179,630 and 3,179,631 and Sroog et al., J. Polymer Science Part A, vol. 3, pages 1373 to 1390, 1965.

Preferably the copolyimides of the invention are prepared by reaction of the appropriate molar proportions of a single dianhydride or mixtures of dianhydrides with the appropriate molar proportions of 4,4'-methylenebis (phenyl isocyanate) (MDI) and toluene diisocyanate (TDI) (2,4-isomer or 2,6-isomer or mixtures thereof) in the presence of a dipolar aprotic solvent. Illustrative of the latter solvents are dimethyl sulfoxide, dimethylacetamide, hexamethylphosphoramide, N-methyl-2-pyrrolidone, tetramethylurea, pyridine and the like. The reaction takes place readily when the reactants are brought together at ambient temperatures but elevated temperatures, up to about 160° C. can be employed, if desired, in order to increase the rate of reaction. In carrying out the reaction the dianhydride(s) can be brought together with the mixture of methylenebis(phenyl isocyanate) and toluene diisocyanate so that reaction between the anhydride and each isocyanate occurs simultaneously with production of an essentially random copolyimide.

However, this is not to say some block copolyimide could not be present because of the difference in the reaction rates of the two isocyanates, the methylenebis(phenyl isocyanate) being the more reactive of the two. This constitutes the easiest mode of carrying out the reaction as the methylenebis(phenyl isocyanate) which is normally a solid can be dissolved in the liquid toluene diisocyanate and both added simultaneously as a solution. However, if for some reason a block copolyimide is desired then the isocyanates can be allowed to react separately. The precise composition of the copolyimide, i.e. the ratio of numbers of recurring units corresponding to the imides from toluene diisocyanate and methylenebis(phenyl isocyanate), derived from the appropriate anhydrides is controlled by selecting the appropriate molar proportions of the diisocyanates and dianhydrides used in the above reaction. Whatever the relative proportions of the isocyanates and dianhydrides which are employed, the total amount of isocyanates employed in the reaction is such as to be substantially equimolar with respect to the dianhydrides.

The copolyimides of the invention can also be prepared by reacting something less than the stoichiometric amount of the diisocyanate in a first stage with the dianhydride, e.g. 95% of the diisocyanate; followed in a second stage by the stoichiometric amount of the diamine corresponding to the diisocyanate necessary to complete the polymerization. Ring closure of the amic-acid linkages is easily accomplished by distilling a combination of the reaction solvent and the formed water from the polymerization under reduced pressure. The choice of which diamine to use is purely one of convenience and not limited in any way. This technique can sometimes result in a more controlled approach for reaching high molecular weight polymers with less chance for side reactions. When attempting to polymerize the last remaining anhydride groups, an excess of diamine in the reaction mixture can be tolerated much more readily than an excess of isocyanate groups which are subject to trimerizing side reactions.

The amount of dipolar aprotic organic solvent employed in the above described reaction is advantageously at least sufficient to ensure that all the reactants are in solution initially. Advantageously, the amount of solvent employed is such that a final polymer concentration of 5%–25% by weight is obtained. The upper limit on the amount of solvent employed is dictated purely by economic considerations. The lower limit on the amount of solvent employed is dictated by the viscosity and resultant problems in processing a viscous solution. However, the preferred range is 10%–15% by weight.

In general, the desired copolyimide of the invention is soluble in the reaction mixture as it is formed in the above described reaction. Copolyimides having such solubility are readily precipitated from the final reaction product by addition of a solvent such as acetone, tetrahydrofuran, methylethylketone, chloroform, xylene, benzene, hexane, and the like in which the copolyimide is insoluble. The copolyimides so obtained can be purified, if desired, by washing with appropriate solvents in which impurities, such as unreacted starting materials, are soluble.

However, one of the outstanding advantages of the copolyimides of the present invention is their solubility in the reaction mixture as they are formed. Therefore, if the copolyimide is to be used in a coating application, as a lacquer, or in a laminating process, then there is no need to isolate the copolyimide from solution. An object of the invention is to provide coating solution of the copolyimides hereinbefore described and in the useful concentration ranges hereinbefore set forth.

When isolated, the copolyimides are generally obtained as powders or coarse solid materials. In order that they can be fabricated into useful high temperature resistant articles, such as those which are commonly prepared from polyimides, it is necessary to mold the copolyimide. This is accomplished generally by converting the copolyimide to a fine powder and subjecting the latter to molding using techniques conventionally employed in molding powdered metals such as by sintering or hot pressing; see, for example, "Encyclopedia of Chemical Technology," edited by Kirk and Othmer, Interscience Encyclopedia, Inc., vol. 11, pages 54–55, New York, 1953.

It is in the behavior on molding that at least one of the highly useful properties of the copolyimides of the invention is manifested. Thus, the copolyimides of the invention exhibit markedly better flow properties on molding than do the corresponding polyimides made from methylenebis(phenyl isocyanate) alone. Further, the higher glass transition temperatures of the copolyimides of the invention, as compared with the polyimides derived from methylenebis(phenyl isocyanate) alone, means that a corresponding increase in high temperature stability is achieved. As pointed out previously, these advantages are achieved without any significant loss of the highly desirable structural strength properties associated with a polyimide derived from methylenebis(phenyl isocyanate) alone. This finding is particularly surprising in view of the markedly lower structural strength properties possessed by polyimides derived from toluene diisocyanate alone.

The copolyimides of the invention can be employed for any of the uses to which high temperature resistant polyimides are currently put in the art, for example, the copolyimides of the invention can be molded in the form of bushings, seal faces, electric insulators, compressor vanes and impellers, piston rings, gears, thread guides, cams, brake lining, clutch faces, abrasive articles and the like. In solution form they can be employed in the preparation of polyimide coating compositions and can thereby be employed in wire coating and in the casting or spraying of polyimide films on a variety of substrates such as metal, ceramic, fabrics, polymerics and the like.

Indeed, the copolyimides of the invention being soluble in organic solvents represent a particularly useful advance in the art since they provide, for the first time, a means of fabricating high temperature resistant polyimides without the need to carry out a final chemical reaction to produce the polyimide in situ. Thus, in order to produce polyimide coatings having useful high temperature resistant properties on a variety of substrates such as wire, fabrics and the like, or to apply polyimides as high temperature resistant adhesives for metals and the like, it has hitherto been necessary to use a solvent soluble polyimide-forming precursor which is applied in organic solvent solution as a coating or the like and is then converted in situ to the desired polyimide by heat treatment, or chemical treatment and the like; see, for example, U.S. 3,179,630.

In contrast, the soluble copolyimides of the invention can be applied directly as a coating or adhesive and removal of the carrier solvent is the only operation to be accomplished after application. Further, because of the thermoplasticity of these copolyimides, shaping or molding of the coated material can be accomplished after removal of solvent. This is of particular advantage in the preparation of laminates and the like from fabric and like materials coated with the copolyimides of ths invention.

Reinforced composites made by incorporating fibrous reinforcements into the copolyimides of the invention can be manufactured by lamination, coating, molding and other methods known to those skilled in the art.

The fibrous reinforcements can include those produced from inorganic material such as quartz, metal, glass, boron, or graphite fibers, or organic materials like aromatic polyamides, polyimides, polyamide-imides, or other high temperature resistant fibers. The fibrous reinforcements can be in the form of filaments, yarn, roving, chopped roving, knitted or woven fabrics.

In a practical embodiment, a plurality of layers of a woven fibrous reinforcement impregnated with a solution of a copolyimide of the invention from which a major portion of the solvent has been removed, can be brought together in a heated press and formed into a true laminate.

In another embodiment, a plurality of layers of a solid copolyimide of the invention in which is embedded roving or yarn, formed by removing the solvent from a solution of a copolyimide mixed with the roving or yarn, can be brought together in a heated mold and formed into a reinforced composite.

In yet another embodiment, roving which has been coated with a solution of a polyimide of the invention and the solvent removed, can be chopped into pieces, placed in a heated mold and formed into a reinforced composite. A variation of this embodiment consists of molding an intimate mixture of chopped roving, yarn, or filament and a powdered copolyimide of the invention to form a reinforced composite. Other techniques of fabricating reinforced composites using the copolyimides of the invention will be readily apparent to those skilled in the art.

The solvent soluble polyimides of the present invention exhibit superior heat resistance as compared with the soluble polyimides of the above identified copending application Ser. No. 124,958, now U.S. 3,708,458 as evidenced by the much higher Tg values (e.g., 367° C.) of the copolyimides of this invention when compared to the maximum of 304° C. for the copolyimides in the above copending application.

The organic solvent soluble copolyimides of the invention also show advantages over high temperature resistant polyimides hitherto known in that their properties enable them to be used to produce articles having reinforcing or modifying fillers and the like incorporated therein. Thus, fillers such as fiberglass, carbon fibers, graphite, molybdenum disulfide (to impart lubricity), powdered metals such as aluminum, copper and the like, and abrasive materials (for producing grinding wheels and the like) can be added to solutions of the soluble copolyimides of the invention and intimately mixed therewith prior to removal of solvent followed by heat pressing or like techniques necessary to achieve production of the desired article. Other processing advantaegs which accrue from the high temperature resistance, solvent solubility and thermoplasticity of these copolyimides of the invention will be apparent to one skilled in the art.

The following examples describe the manner and process of making and using the invention and set forth the best mode contemplated by the inventors of carrying out the invention but are not to be construed as limiting.

EXAMPLE 1

A 1.5 liter resin kettle equipped with a reflux condenser, thermometer, mechanical stirrer, constant addition funnel, and a side-arm distillation (no condenser) apparatus, was set up in an oil bath.

750 ml. of dry N-methylpyrrolidone (NMP) was placed in the kettle along with 87.25 g. (0.4 mole) of pyromellitic dianhydride (PMDA) and heated to 80° C. The dark brown solution was then placed under vacuum (0.6 mm. Hg) causing 30 ml. of NMP and a trace quantity of water to distill off.

A solution of 55.7 g. (0.32 mole, 80%) of toluene diisocyanate (TDI: pure 2,4-isomer) and 20.0 g. (0.08 mole, 20%) of methylenebis(phenyl isocyanate) (MDI) was charged to the addition funnel. It was added slowly to the PMDA solution over a 4.5 hour period at 80° C. Carbon dioxide gas bubbles were evident on the surface within one hour of the addition. Stirring and heating were continued and 0.5 hour after completion of the NCO addition an infrared spectrum showed the presence of small amounts of NCO and anhydride. An additional 100 ml. of NMP was added to reduce solution viscosity with heating at 80° C. continued. One hour after NCO addition was completed, the infrared analysis indicated only trace amounts of NCO and anhydride. Another 100 ml. portion of NMP was added to reduce viscosity and 1.5 hours after NCO addition had been completed, the reaction was stopped. The final polymer solution concentration was 12.0%; $\eta_{inh.}$ (1.0% in NMP)=0.83. There was thus obtained a solution in N-methylpyrrolidone of a copolyimide characterized by a recurring unit of the formula:

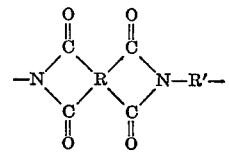

wherein R represents

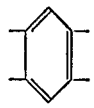

and wherein R' in 20 percent of the units represents

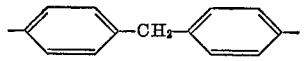

and in the remaining 80 percent of the units represents

Laminates and films were prepared from the polymer solution by standard techniques.

EXAMPLE 2

The copolyimide prepared as described in Example 1 was isolated by extruding the hot NMP solution into warm (72° C.) water. The resulting solidified rope-like strands were ground in a Waring Blender with hot water and washed for 2 hours, collected by filtration and washed twice again. The final slurry was filtered, allowed to air-dry overnight and then vacuum dried at 180° C. for 16–20 hours.

TGA analysis of the polymer showed a 1.8% weight loss due to water but no further loss until 300° C. Gehman curve analysis (plot of torsion moduli vs. temperature, ASTM D1053–65) showed a softening to a low value of yield point of 425° C. While the polymer was soluble in the reaction solution, once isolated it could not be redissolved in NMP or dimethyl sulfoxide (DMSO).

TGA ANALYSIS

| | Percent wt. loss (in air) |
|---|---|
| 100° C. | 1.8 |
| 200° C. | 1.8 |
| 300° C. | 2.0 |
| 400° C. | 4.0 |
| 450° C. | 12.5 |
| 500° C. | 85.0 |
| 550° C. | 98.0 |

EXAMPLE 3

The apparatus described in Example 1 was charged with 65.4 g. (0.3 mole, 75%) of pyromellitic dianhydride and 32. g. (0.1 mole, 25%) of 3,3′,4,4′-benzophenone tetracarboxylic acid dianhydride. The mixture was dissolved in 750 ml. of NMP forming a dark brown solution which was heated to 80° C. by means of an oil bath. By reducing the pressure to approximately 1–2 mm. Hg, 50 ml. of solvent plus moisture was taken off overhead.

A solution of 48.8 g. (0.28 mole, 70%) of TDI in 25.0 g. (0.10 mole, 25%) of MDI was charged to the addition funnel (this constitutes 95% of the theoretical NCO). The isocyanate was slowly added over a 6 hour period, rinsing the addition funnel clean with 25 ml. of NMP which was added to the reaction mixture. The reaction was allowed to proceed overnight while maintaining the temperature at 80° C.

A second addition funnel was charged with 5.6 g. (0.028 mole) of methylene dianiline dissolved in 35 ml. of NMP. This was equivalent to the 5% MDI deficiency plus a 2% excess. It was added slowly so that after 3.5 hours, when approximately 70% was consumed, reaction viscosity was very high. The reaction mixture was diluted with 400 ml. of NMP which reduced the original concentration from 15.5% down to 11.1%. Temperature was increased to 98° C. Further addition of MDA was limited to only 0.5% excess due to viscosity.

Ring closure of the amic-acid fraction was accomplished by distilling 50 ml. of combined NMP and moisture from the kettle under reduced pressure. Continued stirring at 98° C. for 2 hours reduced the viscosity. Infrared analysis still showed some anhydride present. More MDA was added to a total of 3.5% excess and more NMP (130 ml.) was stripped off under vacuum at 98° C. The final reaction concentration was 12.4%.

A portion of the reaction solution which was allowed to cool to ambient temperature had an average $\eta_{inh.}=1.41$ after 3 days standing. A sample of the polymer solution stored at 80° C. for 3 days had an average $\eta_{inh.}=0.75$. The room temperature solution did not precipitate or gel even after 2 months standing.

The solid polymer was isolated from its hot solution by precipitation in warm water, washed, collected, then washed twice again and finally dried at 200° C. under vacuum. There was thus obtained a copolyimide characterized by a recurring unit of the formula:

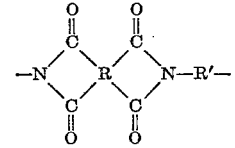

wherein R in 75 percent of said units represents

and, in the remaining 25 percent, represents

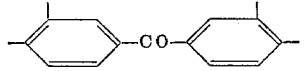

and wherein R′ in 70 percent of said units represents

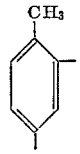

and, in the remaining 30 percent, represents

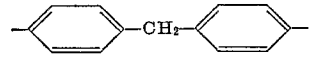

Once isolated from solution, the copolyimide would not redissolve either in NMP or DMSO. A 1% solution in concentrated sulfuric acid had an $\eta_{inh.}=0.12$.

The polymer powder was easily molded at 395° C. at 25,000 p.s.i. The resulting test bars showed a Tg of 367° C. by Gehman analysis versus a Tg of 382° C. by Thermomechanical Analysis which is remarkably good agreement for the determination of a second-order transition by two different methods. The test bars showed an average flexural strength of 18,850 p.s.i. and flexural modulus of 419,000 p.s.i.

EXAMPLE 4

The apparatus described in Example 1 was charged with 65.4 g. (0.3 mole, 75%) of PMDA and 32.2 g. (0.1 mole, 25%) of BTDA dissolved in 905 ml. of NMP (dried over 3A molecular sieves). After heating the dark colored solution to 80° C. by an oil bath, 129 ml. of NMP was slowly distilled out under reduced pressure (4–5 mm. Hg over a 3 hour period) until the total NMP volume was 776 ml. (15% conc.).

A solution 48.8 g. of TDI (0.28 mole, 70%) and 30.0 g. (0.12 mole, 30%) of MDI was charged to the addition funnel. The anhyride solution was saturated with carbon dioxide, a wet test meter was zeroed, and the slow addition of the NCO solution was initiate at 80° C. Over a 5.75 hour period the addition was complete with 10 ml. of NMP used to rinse the addition funnel into the reaction mixture. Following this, 60 ml. of solvent was stripped from the mixture under reduced pressure over an hour to result in a 16% reaction cencentration. The stripped NMP showed a trace of moisture by observing the 2.95µ peak absorbance difference from the sieve dried material. The reaction mixture was allowed to stir overnight.

An increase in viscosity was observed and infrared showed no NCO remaining but a trace of anhydride. A second NCO solution was prepared from 0.8 g. (1 mole percent) of MDI in 10 ml. of NMP and a 0.1% excess was added and allowed to react. The solution was diluted with NMP to achieve a 14% concentration.

A sample of the reaction mixture was diluted to 1.0% from 14.0% and had an average $\eta_{inh.}=1.05$.

There was thus obtained a solution in N-methylpyrrolidone of a copolyimide characterized by the recurring unit of the formula:

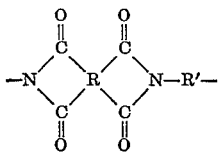

wherein R in 75 percent of said units represents

and, in the remainder of said units represents

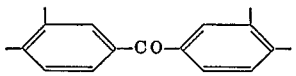

and wherein R' in 70 percent of said units represents

and, in the remainder of said units represents

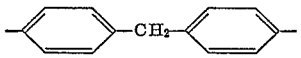

Films were cast using normal casting and drying procedures.

EXAMPLE 5

The apparatus described in Example 1 was charged with 65.4 g. (0.3 mole, 75%) of PMDA and 32.2 g. (0.1 mole, 25%) of BTDA dissolved in 905 ml. of NMP. The colored solution was brought to 80° C. by means of an oil bath and 130 ml. of NMP was slowly distilled out under reduced pressure (3 mm. over a 2 hour period) until the total NMP volume was 775 ml. (15% concentration).

A solution of 62.75 g. (0.36 mole, 90%) of TDI and 10.0 g. (0.04 mole, 10%) of MDI was charged to the addition funnel. At a reaction temperature of 80° C., the NCO solution was added over a 6.0 hour period and 10 ml. of NMP used to rinse the addition funnel into the resin kettle. A 60 ml. portion of solvent was removed from the reaction mixture under reduced pressure at 80° C. which resulted in a 16% concentration of polymer in solution.

An additional 1% excess of NCO was added as a solution of 0.63 g. (0.0036 mole) of TDI and 0.10 g. (.0004 mole) of MDI in 60 ml. of NMP as a carrier. The addition took 1 hour and the reaction mixture was heated at 80° C. for an additional 2 hour period.

The solid polymer was isolated by extruding the hot NMP solution into warm water. The solidified rope-like strands were ground in a Waring Blender with hot water and washed for 2 hours. The solid was collected and washed twice again in water. The final slurry was filtered, allowed to air-dry and then vacuum dried at 180° C. for 20 hours. There was thus obtained a copolyimide characterized by the recurring unit of the formula:

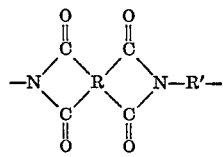

wherein R in 75 percent of the recurring units represents

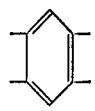

and, in the remaining 25 percent represents

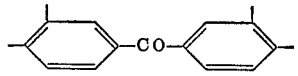

and wherein R' in 90 percent of the recurring units represents

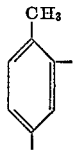

and, in the remaining 10 percent, represents

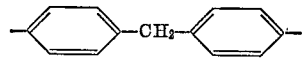

This solid polymer was very easily molded due to the high TDI concentration.

EXAMPLE 6

For purposes of comparison a polyimide of the prior art derived from PMDA and TDI alone, was prepared as follows: A 1500 ml. resin kettle equipped with a reflux condenser connected to a gas inlet tube, a long stem thermometer, a 125 ml. addition funnel, a mechanical stirrer, and a gas capillary tube was flamed out under vacuum and flushed with dry $CO_2$.

A combination of 695 ml. of NMP (dried over 3A molecular sieves) and 87.25 g. (0.4 mole) of PMDA was charged to the kettle and, after stirring, the reddish-yellow solution was heated to 100° C. while being saturated with $CO_2$.

A solution of 69.67 g. (0.4 mole) of TDI (pure 2,4 isomer) dissolved in 55 ml. of NMP was charged to the addition funnel. The $CO_2$ gas flow was terminated and a wet test gas meter connected to the condenser was zeroed. A reaction temperature of 100° C. was maintained while slow addition of the NCO solution was completed over a 5 hour period. After 92% of the NCO had been added, a precipitate began forming and shortly after completion of the NCO addition, the viscosity buildup prevented stirring of the mass and heating was stopped. The reaction mixture formed a firm gel.

The semi-solid gelatinous material was ground up with 2 liters of water in a Waring Blender for 3 hours causing the formation of a filterable solid. It was washed a second time in the blender, collected on a suction filter, air dried, followed by thorough drying at 200° C. under 0.5 mm. pressure for 24 hours.

The resulting copolyimide was characterized by a single recurring unit of the formula:

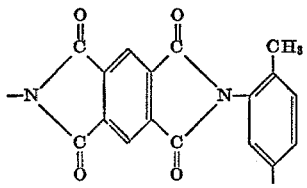

Viscosity measurements of the polymer were not possible due to its insolubility.

EXAMPLE 7

A 10 ply polyimide fiber glass laminate was prepared by first brushing a 30% solution of PMDA-80/20 TDI/MDI polyimide dissolved in NMP (prepared as described in Example 1) on one side of a single layer of 181E (A-1100)[1] fiber glass cloth held in tension on a hand coating machine. Solvent was almost totally removed by infrared heaters and the cloth turned over and the polyimide solution applied to the opposite side. Again the solvent was removed to yield a fiber glass prepreg with a pliable coating of polyimide on both sides. Using this prepreg cloth, any number of layers may be laminated, but in this specific example 10 layers were prepared using the following procedure.

Ten layers of prepreg were placed in a heated press and carried through a first cycle at 350°–400° F. at a maximum pressure of 500 p.s.i. which was allowed to reduce to 0 p.s.i. over 4¾ hours. The second cycle was 7 hours at 400°–620° F., under 200–500 p.s.i. The resulting laminate showed excellent strength retention under high temperature conditions as shown in the following test data.

| Flexural strength (p.s.i.) | | |
|---|---|---|
| Room temp. | 450° F. | 550° F. |
| 14,600 | 9,820 | 8,770 |
| 15,300 | 10,200 | 8,060 |
| 15,000 | 9,720 | 9,270 |
| Flexural modulus (p.s.i.) | | |
| 1,440,000 | 975,000 | 894,000 |
| 1,340,000 | 1,080,000 | 802,000 |
| 1,360,000 | 1,020,000 | 929,000 |

EXAMPLE 8

A 10 ply polyimide graphite cloth laminate was prepared using the procedure described in Example 7, Hitco G(G 1550)[2] graphite cloth being used in place of fiber glass cloth. Ten individual graphite cloth prepreg layers were laminated using the same two cycle procedure outlined in Example 7. The resulting laminate showed excellent strength retention under high temperature conditions (≅500° F.).

We claim:

1. A copolyimide having the recurring unit

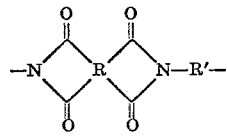

---
[1] 181E (A-1100) is a fiber glass cloth supplied by Burlington Glass Fabrics Co. and E designates the type of glass and 181 designates the weave; A-1100 is γ-aminopropyltriethoxysilane supplied by Union Carbide and acts as a coupling agent between the glass cloth and the polymer being applied.
[2] Hitco G (G 1550), a product of Hitco Co., is a graphite cloth having 99% minimum carbon content with a fiber diameter of 0.0003 inch.

wherein R in 75–100 percent of said recurring units represents

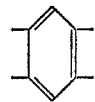

and, in the remaining 0–25 percent of said units, represents

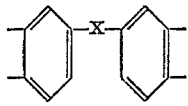

where X is a member selected from the group consisting of CO, O, and $SO_2$; wherein R' in 10–35 percent of said recurring units represents

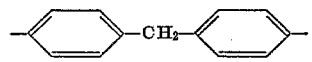

and in the remaining 65–90 percent of said units represents a member selected from the group consisting of

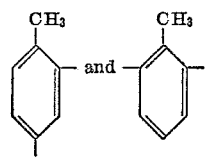

and mixtures thereof.

2. A copolyimide according to claim 1 wherein 75 percent of the recurring units are those in which R represents

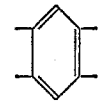

and the remaining 25 percent of said recurring units are those in which R represents

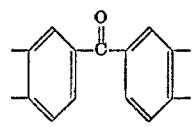

3. A copolyimide according to claim 1 wherein 100 percent of the recurring units are those in which R represents

4. A copolyimide according to claim 1 wherein 100 percent of the recurring units are those in which R represents

and wherein 80 percent of said recurring units are those in which R' represents a member selected from the group consisting of

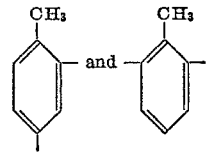

and mixtures thereof and the remaining 20 percent of said units are those in which R' represents

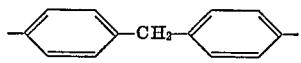

5. A copolyimide according to claim 1 wherein 75 percent of the recurring units are those in which R represents

and the remaining 25 percent of said units are those in which R represents

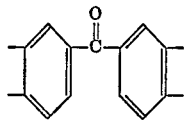

and wherein 70 percent of the recurring units are those in which R' represents a member selected from the group consisting of

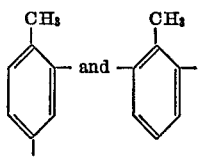

and mixtures thereof and the remaining 30 percent of said units are those in which R' represents

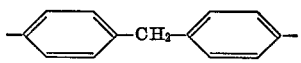

6. A copolyimide according to claim 1 wherein 75 percent of the recurring units are those in which R represents

and the remaining 25 percent of said units are those in which R represents

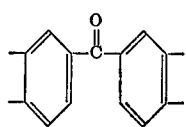

and wherein 90 percent of the recurring units are those in which R' represents a member selected from the group consisting of

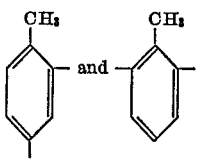

and mixtures thereof, and the remaining 10 percent of said units are those in which R' represents

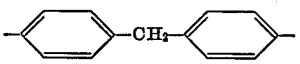

7. A copolyimide solution comprising a copolyimide as recited in claim 1 dissolved in a dipolar aprotic solvent.

References Cited

UNITED STATES PATENTS

| | | | |
|---|---|---|---|
| 3,300,420 | 1/1967 | Frey | 260—2.5 |
| 3,489,696 | 1/1970 | Miller | 260—2.5 |
| 3,422,061 | 1/1969 | Gall | 260—47 |
| 3,347,808 | 10/1967 | Levine et al. | 260—29.1 |
| 3,546,175 | 12/1970 | Angelo | 260—65 |
| 3,666,709 | 5/1972 | Suzuki et al. | 260—33.4 |
| 3,708,458 | 1/1973 | Alberino et al. | 260—65 |

LESTER L. LEE, Primary Examiner

U.S. Cl. X.R.

161—197, 227; 260—30.2, 30.6 R, 30.8 DS, 32.4, 32.6 N, 77.5 R, 78 TF